Nov. 12, 1963  D. C. ABBOTT  3,110,067
APPARATUS FOR PRODUCING REFACTORY LINED MOLDS
Filed June 1, 1959  4 Sheets-Sheet 1
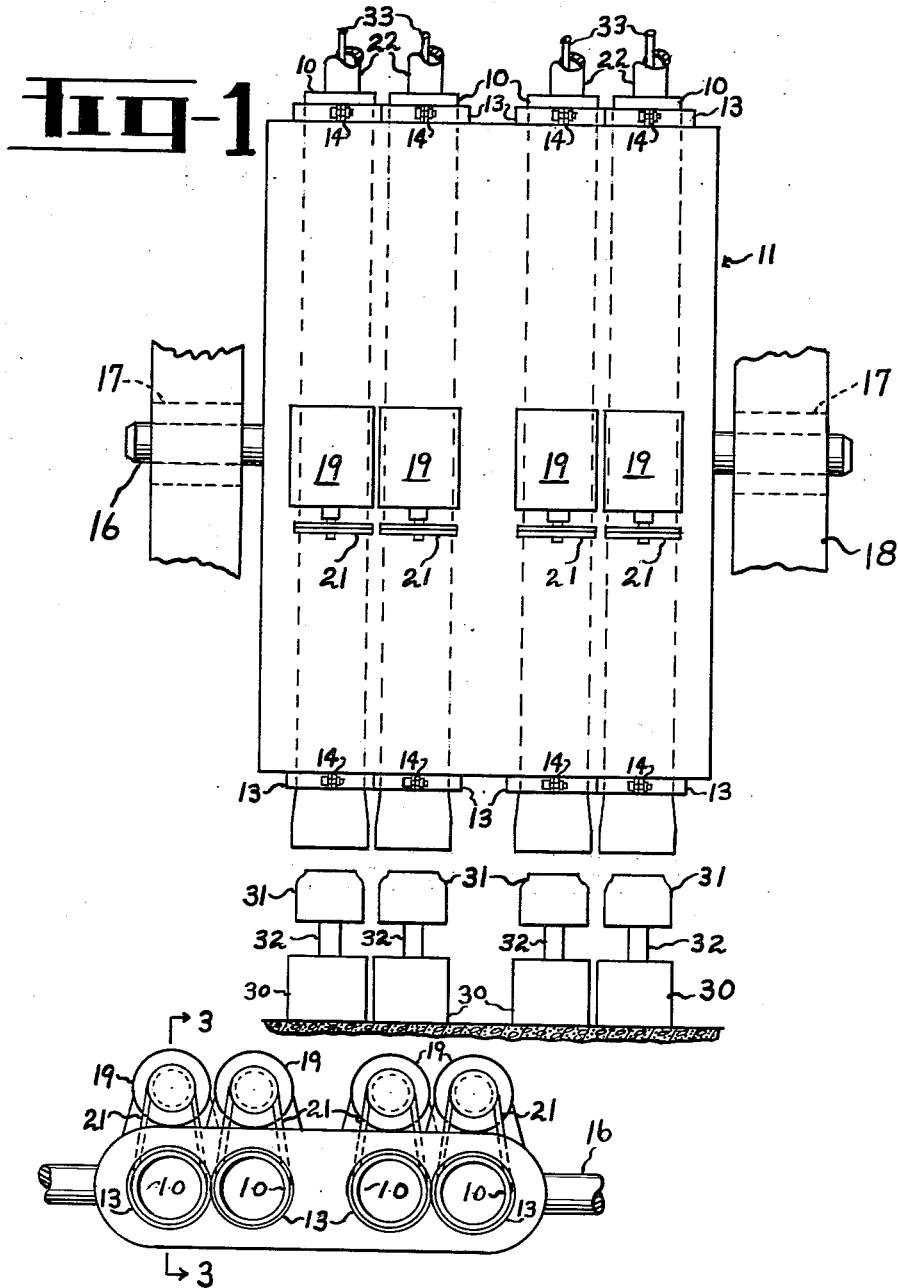

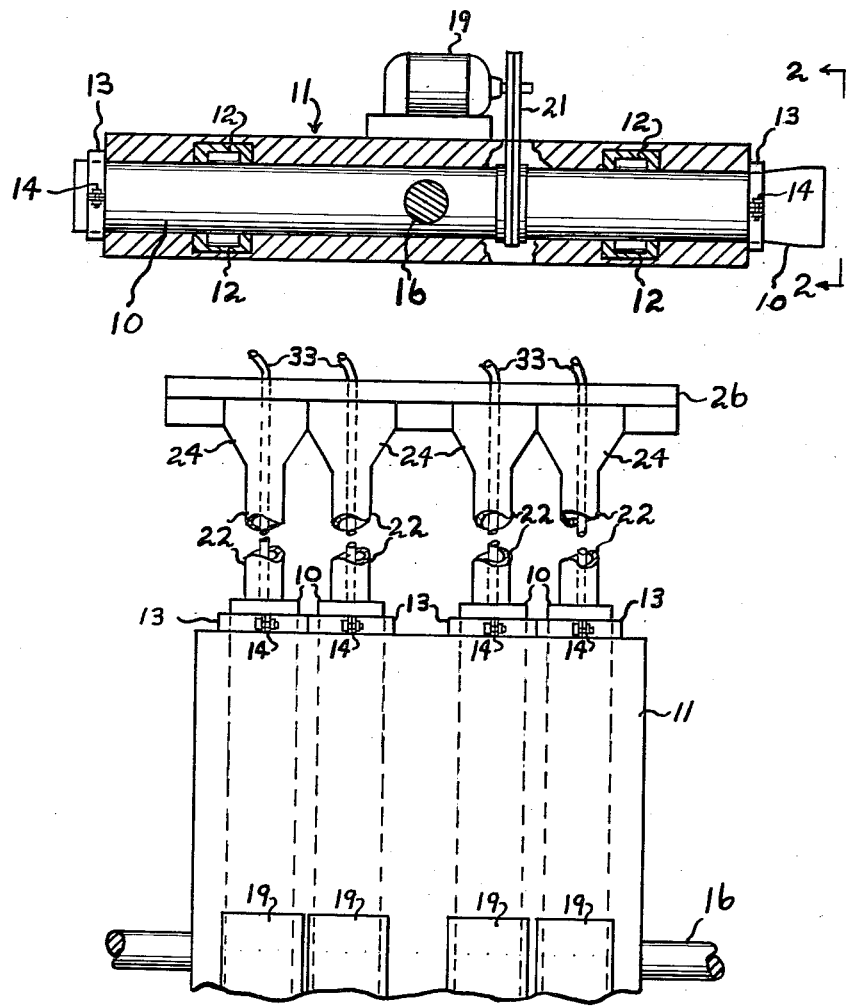

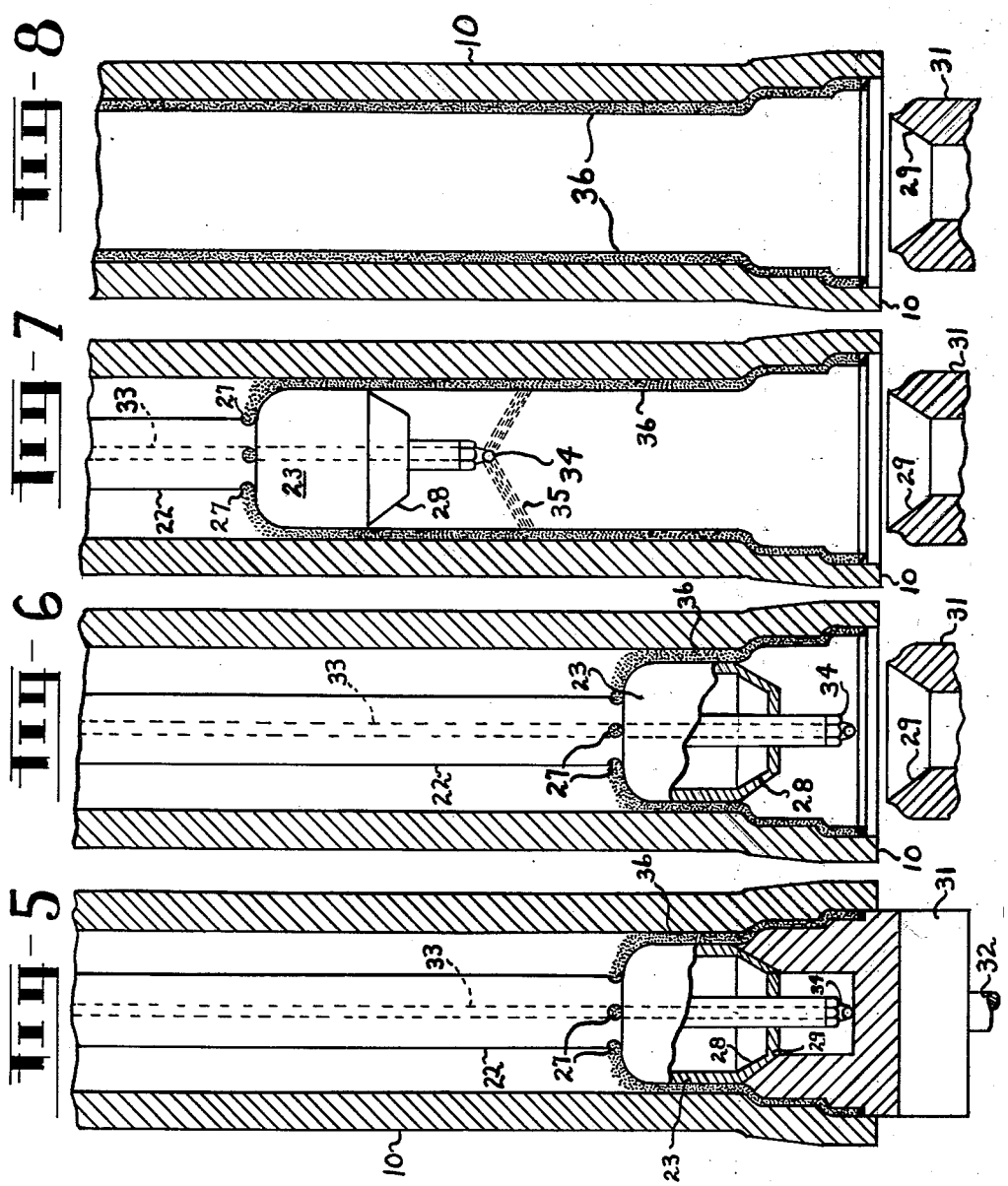

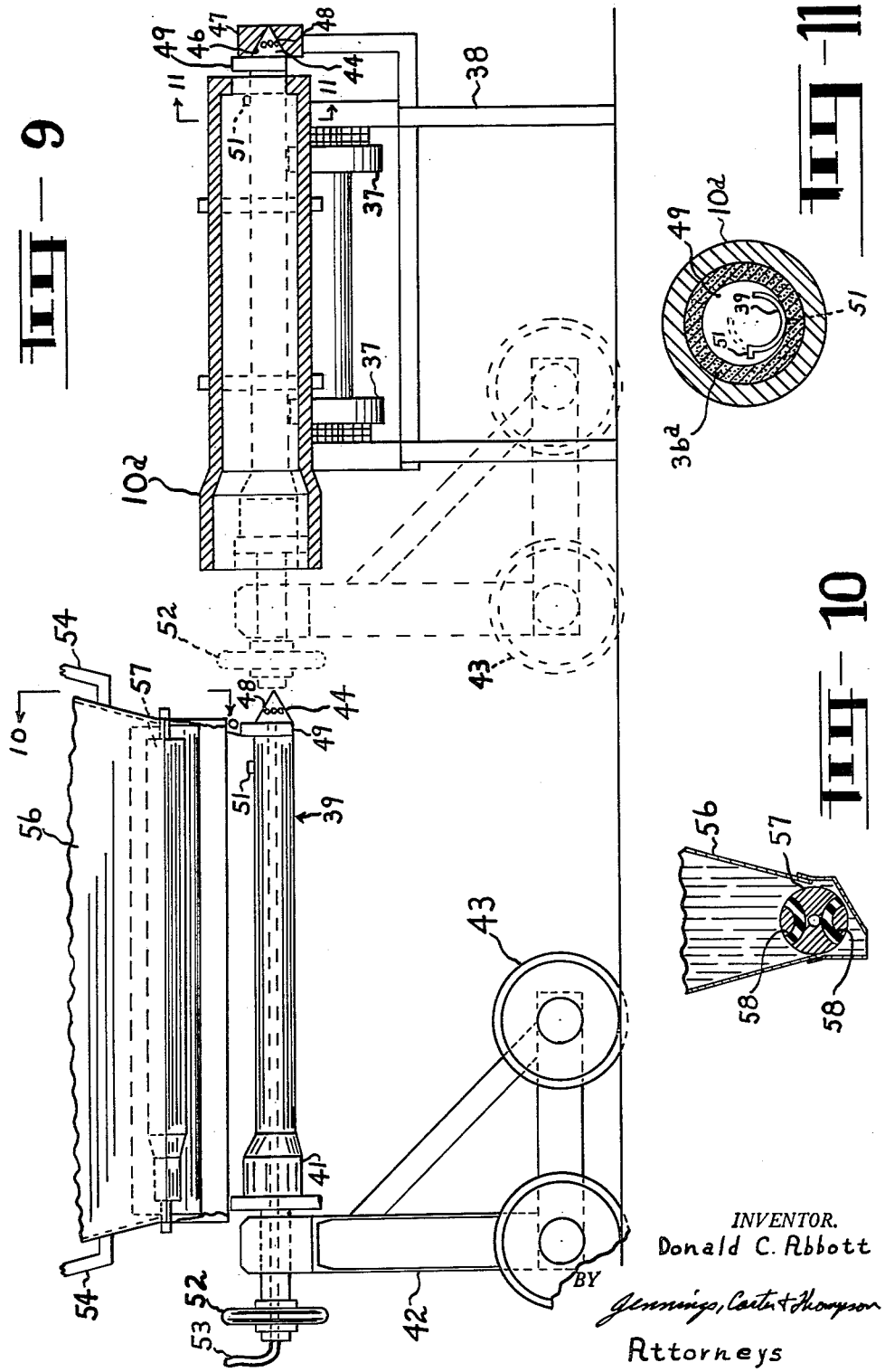

United States Patent Office 3,110,067
Patented Nov. 12, 1963

3,110,067
APPARATUS FOR PRODUCING REFRACTORY LINED MOLDS
Donald C. Abbott, Rte. 1, Box 299, Leeds, Ala.
Filed June 1, 1959, Ser. No. 817,253
2 Claims. (Cl. 22—18)

This invention relates to an apparatus for producing refractory lined molds and has for an object the provision of such an apparatus which shall apply a relatively thin retaining inner surface on the refractory lining whereby the lining is held in situ until molten metal is poured thereagainst, whereupon the retaining inner surface disintegrates, thus facilitating the removal of the refractory lining from the mold after the metal article is cast therein.

Another object of my invention is to provide an apparatus for forming refractory lined molds of the character designated which may be used immediately for casting metal objects therein or may be stored for indefinite periods of time before casting the metal objects therein.

A further object of my invention is to provide a process and apparatus for producing refractory lined molds of the character designated in which a predetermined amount of refractory lining material is introduced into the mold and only the inner surface of the refractory lining is fused together by a bonding material, thereby eliminating waste of materials and permitting reuse of the refractory material, together with the utilization of the heat carried by the refractory material which is brought about by the pouring of molten metal against the refractory lining during the casting of metal objects therein.

A further object of my invention is to provide an apparatus for producing refractory lined molds of the character designated in which the heat of the refractory material fuses the heat fusible bonding material applied to the inner surface of the lining whereby a retaining inner surface is formed on the lining.

A still further object of my invention is to provide an apparatus for forming refractory lined molds of the character designated which shall reduce materially the overall cost of making refractory lined molds and which shall produce improved refractory lined molds which are accurate in all dimensions.

Briefly, my improved process comprises forming a heated refractory lining of predetermined thickness on the inner surface of a rotating mold and applying a heat fusible bonding material to the inner surface only of the heated refractory lining whereby the heat from the refractory lining fuses the bonding material to produce a retaining inner surface on the refractory lining, to thus hold the refractory lining in situ until the molten metal is poured thereagainst.

Apparatus embodying features of my invention and which may be employed to carry out my improved process is illustrated in the accompanying drawings forming a part of this application, in which:

FIG. 1 is a side elevational view, partly broken away and in sections, showing a plurality of molds in position to receive the refractory lining material;

FIG. 2 is an end view taken generally along the line 2—2 of FIG. 3.

FIG. 3 is a sectional view taken generally along the line 3—3 of FIG. 2, the mold being moved to a horizontal position and the means for rotating the mold being shown in elevation, for the sake of clarity;

FIG. 4 is a fragmental, elevational view showing the means for introducing the refractory lining material into the upper end of the molds;

FIGURES 5 through 8 are vertical, sectional views through one of the mold members shown in FIGS. 1-4 and showing the manner in which the refractory lining material and the heat fusible bonding material is applied to the inner surface of the mold;

FIG. 9 is a side elevational view, partly in section, showing a modified form of my invention in which the refractory lining material is placed in the mold while the mold is in a horizontal position;

FIG. 10 is a fragmental sectional view taken generally along the line 10—10 of FIG. 9; and, FIG. 11 is a sectional view taken generally along the line 11—11 of FIG. 9.

Referring now to the drawings for a better understanding of my invention, I show vertical molds 10 mounted for rotation in a housing 11. As shown in FIG. 3, suitable bearing members 12 are interposed between the molds 10 and housing 11 whereby the molds are adapted for rotation relative to the housing. Secured to the ends of the mold 10 adjacent opposite ends of the housing 11 are split collars 13 which are held in assembled position by suitable bolts 14.

The housing 11 is supported for pivotal movement by a transverse shaft 16 which projects outwardly of opposite sides of the housing. The ends of the shaft 16 are supported by bearings 17 which in turn are mounted in a suitable supporting structure indicated generally as 18. Each of the molds 10 is driven by a motor 19, the motor is being operatively connected to the mold by means of a belt drive indicated generally as 21.

Mounted for axial movement within the mold 10 is an elongated hollow member 22 which carries cylindrical forming member 23 adjacent the lower end thereof. The upper end of each of the elongated hollow members 22 communicates with a supply hopper 24, which is carried by a vertically movable member 26. As clearly shown in FIGS. 5-7, a plurality of openings 27 are provided in the elongated hollow member 22 adjacent the forming member 23 in position to discharge heated refractory material into the space defined between the forming member 23 and the inner wall of the mold 10. That is, the forming member 23 is concentric with the mold 10 and is adapted for axial movement with the elongated hollow member 22 relative to the mold.

The lower end of the forming member 23 tapers inwardly as at 28 whereby it is adapted to engage a tapered recess 29 carried by a bell-forming member 31. The lower end of the bell-forming member 31 is connected to a vertically movable actuating member 32, which may be in the form of a suitable hydraulic ram or the like indicated at 30. The support member 26 for the hoppers 24 together with the elongated hollow members 22 are moved vertically by any suitable means, such as a suitable hydraulic ram or the like.

Extending downwardly through the hoppers 24, the elongated hollow members 22 and the forming member 23 is a conduit 33. The lower end of the conduit 33 projects downwardly beneath the forming member 23 and carries a suitable spray head 34 for spraying a suitable bonding material 35 onto the inner surface of the heated refractory lining formed in the mold and indicated generally as 36. The bonding material may be in the form of a thermosetting resin. Also, the bonding material applied may be sodium silicate. Where sodium silicate is employed, $CO_2$ gas may be applied after the sodium silicate is applied to hasten the formation of an inner retaining lining.

From the foregoing description the operation of my improved apparatus and the manner in which my improved process is carried out will be readily understood. The molds 10 are rotated continuously by the motors 19 while the molds are in a vertical position, as shown in FIGS. 1, 2, and 4 through 8. With the molds thus rotating, the heated refractory lining material such as sand or the like is introduced into the hoppers 24 whereupon it is conveyed to the openings 27 and is discharged into the space defined between the forming members 23 and the inner wall of the molds 10. The heated refractory lining material 36 is first introduced into the space defined between the bell-forming member 31 and the adjacent inner surface of the rotating mold 10 whereby the bell end of the refractory lining is formed. The bell forming member 31 is then retracted axially in a downward direction, as shown in FIGS. 6–8, whereupon the spray-head 34 is in position to spray the bonding material onto the inner surface of the heated refractory lining material 36. The centrifugal force created by rotating the mold holds the refractory material in place until after the bonding material has been applied and set to form a retaining lining. Since the conduit 33 extends through the elongated member 22 adjacent the heated refractory material, the bonding material is preheated, thereby decreasing the curing or evaporation time.

With the bell-forming member 31 removed, the elongated hollow member 22 is raised in an axial direction relative to the mold 10 whereupon the heated refractory lining material 36 is continuously deposited between the outer surface of the forming member 23 and the adjacent rotating inner surface of the mold 10. At the same time, the spray-head 34 moves upwardly with the hollow forming member 22, thus continuously spraying the bonding material onto the inner surface of the heated refractory lining material 36, as shown in FIG. 7. The elongated hollow member 22 and the forming member 23 are continuously moved upwardly until they are removed from the mold 10, as shown in FIG. 8. The housing 11 which carries the individual molds 10 is then rotated in the bearing 17 to a horizontal position, as shown in FIG. 3. Molten metal is then poured into the individual molds 10 in a manner well understood in the art, whereupon the retaining inner surface on the refractory lining 36, which is formed by the bonding material 35 sprayed onto the inner surface of the lining material, disintegrates. With the retaining inner surface on the refractory lining 36 disintegrated, the refractory lining material 36 falls out of the mold 10 upon removal of the article thus cast therein. That is to say, the retaining inner surface on the refractory lining 36 holds the lining in situ until the molten metal is poured thereagainst to form a metal article within the refractory lined mold 10. The heated refractory lining material 36 is screened and then recycled to form another refractory lining for a mold. While I have described the heated refractory material as being recycled, it will be apparent that the refractory material may be heated by other suitable means.

In FIGS. 9, 10 and 11 of the drawings, I show a modified form of my invention in which a mold 10a is rotated about a horizontal axis. The mold 10a is rotatably supported by suitable rollers 37 which in turn are supported by a suitable frame 38.

Adapted for longitudinal movement within the mold 10a is an elongated trough 39 which has an enlarged diameter end portion 41 for holding an additional amount of refractory lining material whereby sufficient lining material is introduced into the mold 10a for forming the bell-end thereof. The trough 39 is mounted on a translatable frame 42 which is mounted on suitable wheels 43. While I have shown the trough as being supported by wheels, it will be apparent that other suitable means may be employed for moving the trough relative to the mold 10a. Also, it will be apparent that instead of moving the trough, the mold 10a may be moved relative to the trough.

The inner end of the trough 39 is provided with a tapered portion 44 which is adapted to engage a tapered recess 46 in a suitable supporting member 47. A plurality of openings 48 are provided in the tapered portion 44 for applying a suitable fusible bonding material to the inner surface of the heated refractory lining formed in the mold 10a.

Mounted adjacent the end of the trough 39 is a forming member 49 which is concentric with the mold 10a, whereby upon removal of the trough from the mold, the forming member 49 engages the rotating inner surface of the lining material indicated at 36a to thus smooth the same.

Mounted on one edge of the trough 39 in position to form the spigot end of the refractory lining is a laterally extending member 51. As shown in FIGS. 9 and 11, the trough 39 is offset or mounted eccentrically relative to the mold 10a whereby upon rotating the trough to dump the refractory lining material 36a into the mold 10a, the projecting member 51 moves to the dotted line position shown in FIG. 11, thereby forming the spigot end of the refractory lining as the mold 10a rotates. The trough 39 may be rotated by any suitable means, such as by a hand wheel 52.

A suitable fusible bonding material is introduced into the mold by means of a conduit 53 which is in communication with the openings 48.

Mounted above the elongated trough 39 on suitable support members 54 is an elongated hopper 56 for supplying the refractory lining material to the trough 39. Mounted for rotation in the lower portion of the hopper 56 is an elongated rotatable member 57 having longitudinally extending recesses 58 in opposite sides thereof for receiving the refractory material 36a and then dumping the same into the trough 39 upon rotation of the rotary member 57. The recesses 58 are of a size to receive a predetermined amount of refractory lining material whereby the exact amount of refractory material is introduced into the trough 39 upon rotating the rotary member 57 one-half revolution.

From the foregoing description, the operation of the apparatus shown in FIGS. 9 through 11 will be understood. The heated refractory lining material is positioned in the hopper 56 and the rotary member 57 is rotated to thus dump a predetermined amount of the lining material into the trough 39. The trough is then moved to the dotted line position shown in FIG. 9, whereupon the tapered portion 44 of the trough is in the recess 46. With the mold 10a rotating, the trough 39 is rotated to the dotted line position shown in FIG. 11 whereupon the projecting member 51 engages the refractory lining material and forms the spigot end for the lining. The enlarged diameter portion 41 not only serves the purpose of holding sufficient refractory lining material to form the bell end of the lining but also engages the refractory lining material in the rotating mold to form the bell end for the lining.

With the bell and spigot ends thus formed in the lining, the trough 39 is removed axially from the mold 10a whereupon the forming member 49 engages the inner surface of the mold and forms a smooth inner surface thereon. It will be noted that the projecting member 51 is out of engagement with the lining material 36a when the trough is rotated back to its original position, as shown in solid lines in FIG. 11. Also, as the trough 39 is being removed, the fusible bonding material is discharged through the opening 48 whereupon the bonding material is applied to the inner surface only of the heated refractory lining 36a.

After the lining material 36a is thus applied to the mold 10a, molten metal is poured into the rotating mold 10a in a manner well understood in the art whereupon a metal article is cast therein. After the molten metal is poured the retaining inner surface of the refractory lining disintegrates, whereupon the lining material falls out of the mold upon removing the article which is cast therein.

From the foregoing, it will be seen that I have devised an improved apparatus for lining generally cylindrical molds with a refractory material. By placing the heated refractory lining material within the rotating mold and then applying a fusible bonding material to the inner surface only of the refractory lining, whereby the heat from the refractory material fuses the bonding material, the lining material may be applied to the mold in a minimum of time and the mold is easily cleaned by merely removing the article which is cast therein.

In view of the fact that the inner surface of the mold does not come in direct contact with the bonding material, the inner surface remains in a clean condition, thus eliminating the necessity of brushing or cleaning the inner surface of the mold. This also reduces greatly the problems encountered in extracting the metal article cast in the mold. Furthermore, by providing a refractory material which has no bonding material in the major portin thereof, permeability of the lining is improved greatly, thus eliminating the need for vents and at the same time eliminating the formation of gas holes in the article cast in the mold. Since the refractory material falls out of the mold after the article is cast therein, the abrasive wear on the inner wall of the mold is reduced greatly.

While I have shown my invention in but two forms, it will be obvious to those skilled in the art that it is not so limited but is susceptible of various changes and modifications without departing from the spirit thereof, and I desire, therefore, that only such limitations be placed thereupon as are specifically set forth in the appended claims.

What I claim is:

1. Apparatus for lining a generally cylindrical mold with a refractory material which comprises means for rotating said mold with its longitudinal axis in a generally horizontal plane, an elongated trough adapted for longitudinal movement within said mold, means for introducing a predetermined amount of noncohesive refractory lining material into said trough while said trough is outwardly of said mold, means for rotating said trough while it is within said rotating mold whereby the lining material is applied to the inner surface of said mold, a forming member adjacent the inner end of said trough adapted to engage the inner surface of the lining material as the trough is withdrawn from said mold whereby said inner surface is smoothed, means to heat said lining material and a spray head carried by the inner end of said trough adjacent said forming member for dispensing a fusible bonding material onto the inner surface only of said heated lining material after said forming member has engaged said material, means for moving said trough axially of said mold while said mold is rotating whereby the refractory lining is applied uniformly to the inner surface of the mold with the inner surface of said lining material being smoothed by said forming member and said fusible bonding material is then applied to the inner surface only of said refractory lining and the heat from the refractory lining material fuses the bonding material to thus fuse together the inner surface of said refractory lining.

2. Apparauts for lining a generally cylindrical mold with a refractory material which comprises means for rotating said mold with its longitudinal axis extending in a generally vertical plane, an elongated hollow member adapted for vertical movement within said mold, means to introduce a heated refractory material into said hollow member, a forming member adjacent the lower end of said hollow member spaced from and concentric with the inner surface of said cylindrical mold, there being a plurality of openings in said hollow member adjacent said forming member for introducing said heated refractory material between the inner surface of said mold and said forming member whereby a lining is formed on the inner surface of said mold, said forming member being adapted to engage the inner surface of said lining while said mold is rotating whereby said inner surface is smoothed, a spray head beneath said forming member and adapted for movement axially of said mold for dispensing a fusible bonding material onto the inner surface of said lining thus formed, means for moving said hollow member and said forming member together with said spray head upwardly and axially within said mold while said mold is rotating, whereby the refractory lining is first applied uniformly to the inner wall of the mold by said forming member with the inner surface of said lining being smoothed by said forming member and said heat fusible bonding material is then applied to the inner surface only of said refractory lining whereby the heat from the refractory lining material fuses the bonding material to thus fuse together the inner surface only of said refractory lining.

References Cited in the file of this patent

UNITED STATES PATENTS

| | | |
|---|---|---|
| 32,956 | Benson | July 30, 1861 |
| 534,328 | Gunn | Feb. 19, 1895 |
| 2,128,327 | Russell | Aug. 30, 1938 |
| 2,239,530 | Langenokl | Apr. 22, 1941 |
| 2,246,063 | Projahn | June 17, 1941 |
| 2,239,681 | Projahn | July 14, 1942 |
| 2,623,809 | Myers | Dec. 30, 1952 |
| 2,688,780 | Anderson | Sept. 14, 1954 |
| 2,731,690 | Coupland | Jan. 24, 1956 |
| 2,814,083 | Beyer | Nov. 26, 1957 |
| 2,824,345 | Zifferer | Feb. 25, 1958 |